T. H. CHADWICK.
METHOD OF AND APPARATUS FOR DRAWING SHEET GLASS.
APPLICATION FILED NOV. 23, 1916.
1,267,849.
Patented May 28, 1918.
3 SHEETS—SHEET 1.
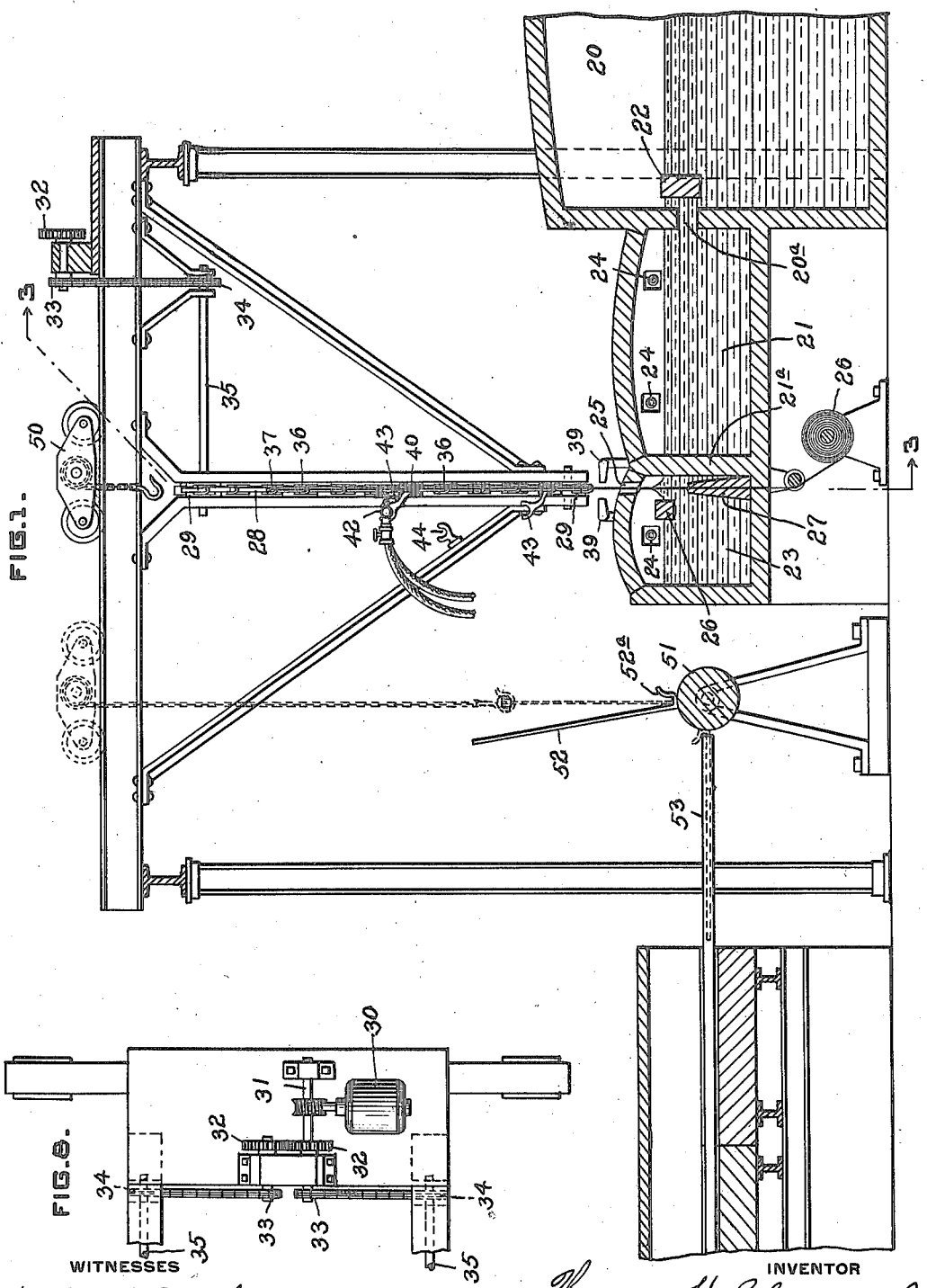
WITNESSES
J. Herbert Bradley
Lois Vineman
INVENTOR
Thomas H. Chadwick
by W. G. Doolittle
Attorney

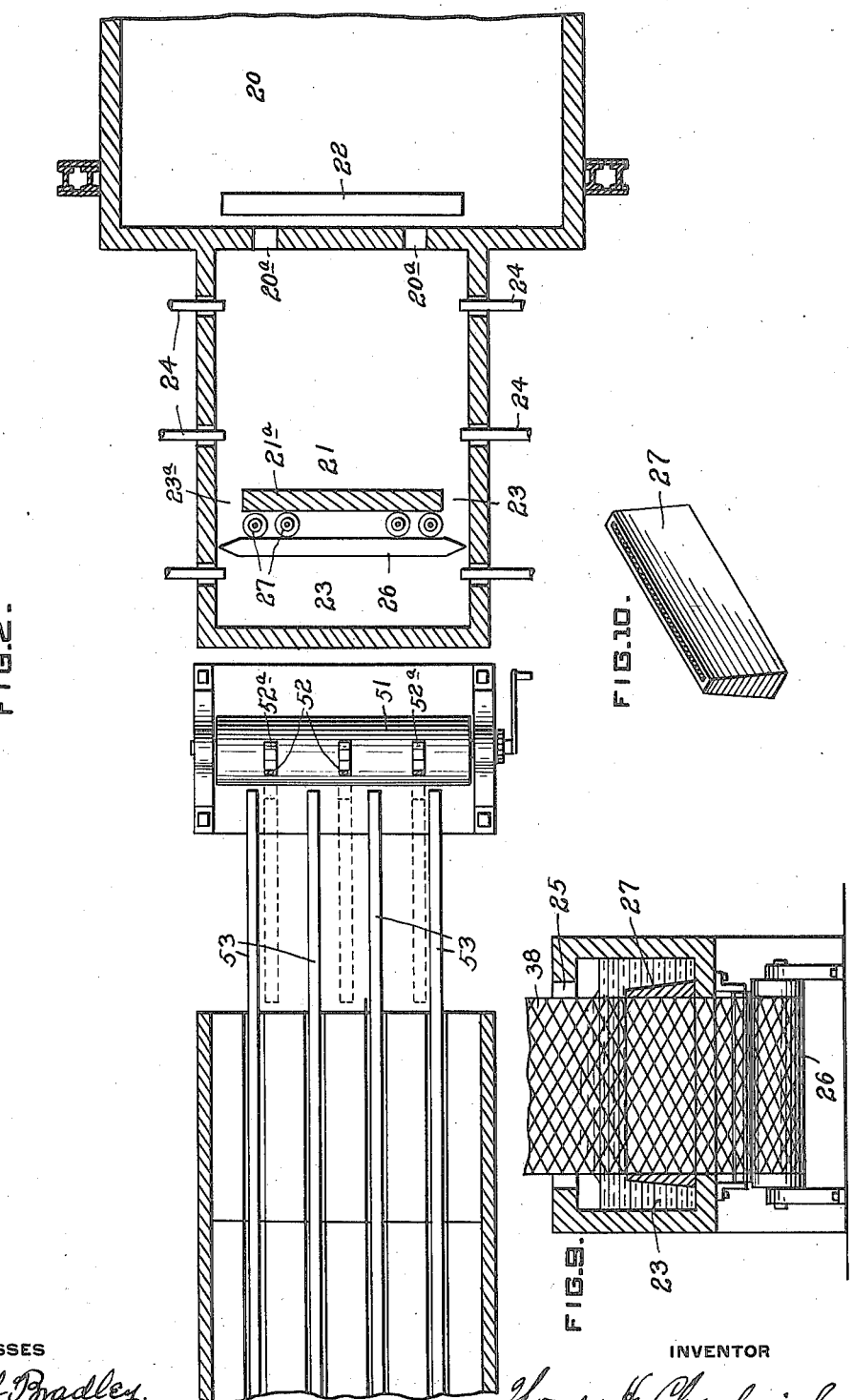

T. H. CHADWICK.
METHOD OF AND APPARATUS FOR DRAWING SHEET GLASS.
APPLICATION FILED NOV. 23, 1916.
1,267,849.
Patented May 28, 1918.
3 SHEETS—SHEET 3.
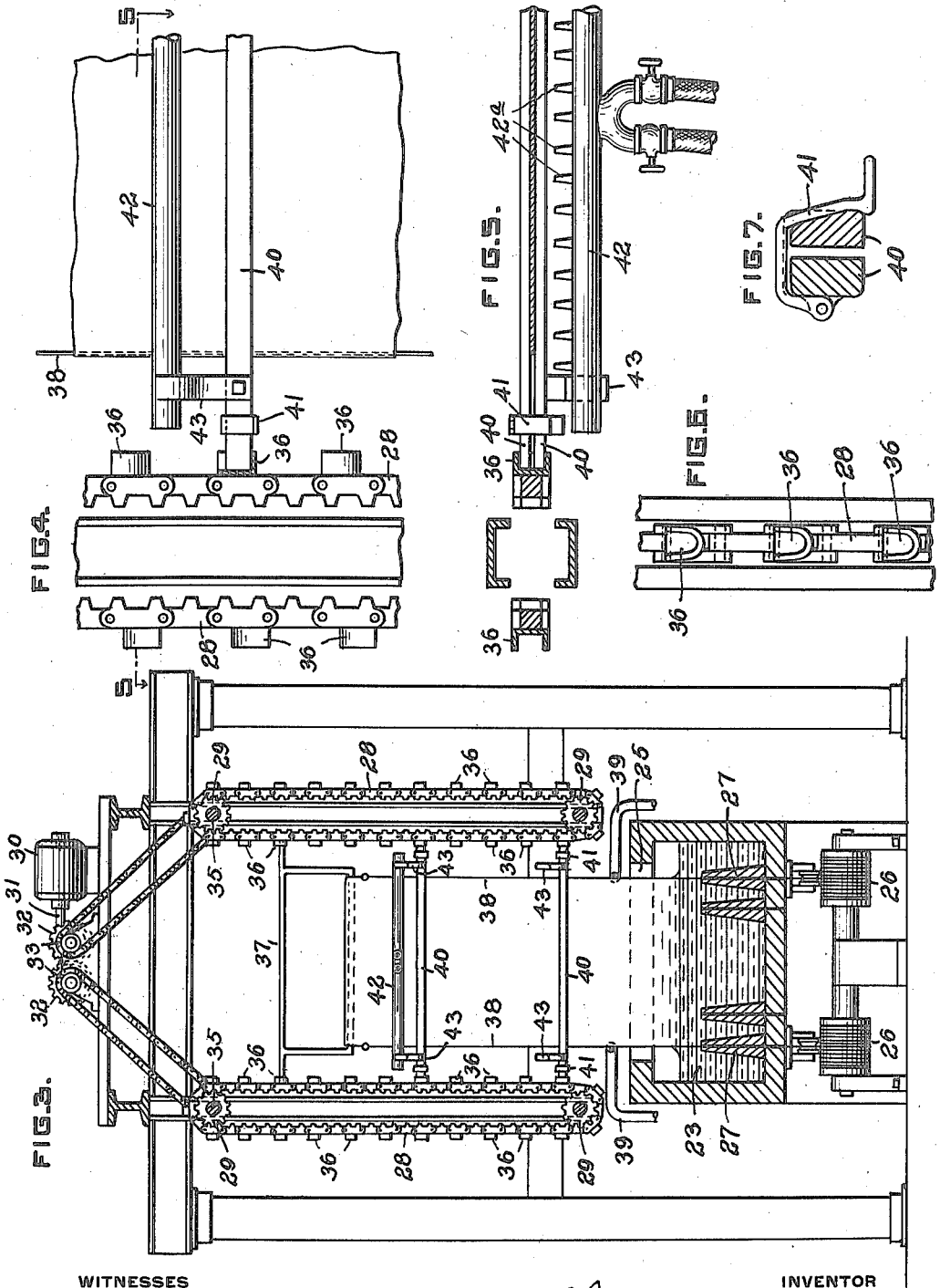
WITNESSES
J. Herbert Bradley.
Lois Wineman.
INVENTOR
Thomas H. Chadwick.
by W. F. Doolittle
Attorney.

UNITED STATES PATENT OFFICE.

THOMAS H. CHADWICK, OF ARNOLD, PENNSYLVANIA.

METHOD OF AND APPARATUS FOR DRAWING SHEET-GLASS.

1,267,849.  Specification of Letters Patent.  Patented May 28, 1918.

Application filed November 23, 1916. Serial No. 132,934.

*To all whom it may concern:*

Be it known that I, THOMAS H. CHADWICK, a citizen of the United States, residing at Arnold, in the county of Westmoreland and State of Pennsylvania, have invented certain new and useful Improvements in Methods of and Apparatus for Drawing Sheet-Glass, of which the following is a specification.

This invention relates to the art of glass making, pertaining more particularly to the art of drawing glass in sheet form from a mass of molten or plastic glass.

Various attempts have heretofore been made to draw sheet glass directly from a mass of molten or plastic glass, but these attempts have generally been unsuccessful commercially, difficulties of various kinds arising in operation, so that the general practice of drawing the glass in the form of cylinders and subsequently manipulating the latter to produce the sheet glass remains the general commercial method.

As will be obvious, apparatus which is capable of commercially operating to produce sheet glass directly from the molten mass of glass is of advantage by reason of the ability to provide for continuous drawing action, thus not only decreasing the cost of labor and time required, but in addition, eliminating the difficulties and extended cycle of manipulations present in the production of the sheets from drawn cylinders. However, as above indicated, certain difficulties are present, and these have not, so far as I am aware, been overcome in such way as would enable the cost of production to meet the similar cost provided by operation under the cylinder drawing methods.

Among these difficulties is that due to narrowing of the sheet which results when an attempt to draw direct is made. In prior apparatus, attempts have been made to overcome this feature by a stretching operation, but this not only involves cumbersome apparatus, but in addition, the results obtained are often ununiform in character.

The present invention is designed to meet this difficulty, as well as to provide apparatus in which the sheet is subjected to a minimum contact with apparatus structure, and apparatus for severing the glass into sheets in a simple and efficient manner, together with similar means for delivering the severed sheet to an annealing oven or leer.

To these and other ends, the nature of which will be readily understood as the invention is hereinafter disclosed, my invention consists in the methods and apparatus hereinafter described, illustrated in the drawings, and more particularly pointed out in the appended claims.

In the accompanying drawings,

Figure 1 is a diagrammatic view indicating a section taken through a general apparatus for carrying out the present invention.

Fig. 2 is a similar view taken horizontally through the apparatus of Fig. 1.

Fig. 3 is a sectional view taken on line 3—3 of Fig. 1.

Fig. 4 is an enlarged detail in elevation of a portion of the conveyer with one of the grips in position.

Fig. 5 is a sectional view taken on line 5—5 of Fig. 4.

Fig. 6 is a view of a portion of the conveyer looking in the direction of the arrow in Fig. 4.

Fig. 7 is a detail sectional view showing the grip sections and clamp.

Fig. 8 is a detail view showing means for driving the conveyers.

Fig. 9 is a detail sectional view indicating a modification.

Fig. 10 is a detail perspective view showing a conduit which may be employed in connection with the structure of Fig. 9.

Referring to the drawings, 20 indicates the chamber from which the molten or plastic glass is delivered into the chamber from which the glass is drawn. This chamber 20 may be the melting and refining chamber or it may be a delivery chamber into which the melted and refined glass is passed. Chamber 20 is provided with one or more outlets 20ª leading into what may be termed a receiving chamber 21, a suitable floater 22 being located within chamber 20 to protect openings 20ª and prevent passage of objectionable matter in a well known manner.

23 indicates the drawing chamber which is in open communication with chamber 21 at the opposite ends of the partition or wall 21a, the spaces at the ends of this wall forming passageways 23a, by means of which the molten glass passes into the drawing chamber 23. As the operation is intended to provide for a continuous drawing action, it is to be understood that the general arrangement of and feed of molten glass to these chambers is such that the level of the molten glass in the drawing chamber is maintained approximately constant.

Suitable heating means, indicated as pipes 24, extend into chambers 21 and 23, thus enabling a better control of the molten condition of the glass to be had.

The sheet is drawn through an elongated opening 25 in the top of the drawing chamber, this opening being located on a vertical plane parallel with and in proximity to a face of wall 21a. As a result, the drawing action takes place in proximity to said wall, and a floater 260 aids in restricting the draw to such point.

As heretofore pointed out, one of the principal difficulties in attempting to draw directly from the mass is the tendency of the sheet to narrow, and in the present invention this difficulty is met by providing means which prevent this narrowing action and thus eliminate any requirement of the use of special mechanism for stretching the sheet during or after the drawing operation. One way of meeting this difficulty is by employing wires at or in proximity to the edges of the sheet, these wires passing through the molten or plastic glass in the direction of draw and forming a part of the drawn sheet. As these wires have a fixed path of travel, and the sheet is treated to more quickly soldify or stiffen the glass at such edges, the tendency to narrow or thin the glass during the drawing operation is practically eliminated.

Referring more particularly to Figs. 1, 2 and 3, it will be seen that the wire is mounted on rolls 26 from where it is led through small perforations formed in cone shaped members 27 of suitable material, such as fire or block clay, the tops of these members 27 being located a suitable distance below the level of the molten glass— a distance of four inches is sufficient for the purpose. In the drawings, I have shown four of these cones. This showing is to take care of different widths of sheets, the wires being shown as extending through the outermost cones, this being the approximate width of the sheet being drawn. Should these small perforations tend to provide an outlet for the molten glass, a cooling air blast may be introduced to chill the glass and thus prevent leakage.

Mounted in the vertical plane of opening 25 is the drawing mechanism which is preferably in the form of a pair of endless chains or carriers 28 mounted on pairs of sprocket wheels 29, the axes of these wheels being transverse to the direction of length of opening 25, the flights of the chains being located on such vertical plane of the opening with the inner flight of each chain located a suitable distance beyond the end of opening 25. By this arrangement, the drawing action is maintained in a single— the drawing—plane, due to the fact that swaying or other movements of the chains of the elevator structure are ineffective to shift the sheet being drawn from this plane, any swaying action of the chains giving the chains movement in the drawing plane instead of transverse to such plane. In addition, the manner in which the sheet is supported on the chains aids in preventing swaying action, as presently described. Chains 28 are driven in unison and in opposite directions by suitable mechanism, such for instance as shown in Fig. 8 in which 30 indicates a motor adapted to drive shaft 31 by means of a worm connection, shaft 31 driving connected gears 32, these gears being mounted on shafts carrying sprockets 33, the latter being connected to sprockets 34 located on shafts 35 which carry the upper sprockets 29. As a result, operation of motor 30 will provide a slow upward travel of the inner flights of chains 28, the connections being such that the links of chains 28 are on substantially the same horizontal plane.

Each link of chains 28 is preferably provided with a U-shaped carrier, the carriers of one chain opposing the carriers of the other chain and thus forming receptacles 36 open at their tops within which may be placed either a bait or grip structures presently referred to, these, when in position, traveling upwardly with the chains, being removable at will through the open tops of carriers 36.

In Fig. 3 I have shown at 37 a simple form of bait, which is preferably employed at the beginning of the drawing operation, the wires 38 being shown as connected thereto. In this view, the bait is shown when approaching the upper end of its movements, but it will be understood that at the start of the operation it is so located as to provide the usual connection of the plastic glass therewith so that when the upward travel begins, the drawing action will take place.

As shown more particularly in Figs. 1 and 3, I preferably provide nozzles or other means, indicated at 39, for applying blasts of hot air to the edges of the sheet as or just after the sheet emerges from opening 25. As a result, there is a tendency to render the glass which surrounds wires 38 less plastic. Since the wire reaches the point of draw from below the level of the molten glass, it will be readily understood that narrowing action will not take place on the drawing plane, and as the action of the blasts takes place before the sheet has traversed a distance where thinning action begins, the glass itself will act to prevent the narrowing action. As will be understood, the partial soldification of the edges by the blasts at this point will produce a condition which prevents a narrowing of the sheet after it has passed these blasts. Inasmuch as each edge carries the wire leading from a fixed point within the path, it will be understood that the width of the sheet will remain practically uniform.

This effect is enhanced by the fact that the molten glass in passing from chamber 21 to chamber 23 passes through passageways 23ª which are located outside of the path of travel of wires 38, together with the presence of the floater 26. This arrangement causes the molten glass, especially at the drawing level, to pass inwardly into the space between wall 21ª and floater 26, insuring the presence of the glass at the sheet edges and tending to prevent such shortage as would tend to thin the glass at such edges. While the drawings show these passageways 23ª as the sole means of communication between chambers 21 and 23, it may be possible that under certain types of installation, distribution of the glass would not be sufficient for meeting the particular necessities, in which case, the wall 21ª may be provided with one or more openings for the passage of the glass. However, this would be in addition to the passageways 23ª, it being preferred that these passageways be employed in all cases, the additional openings being employed where conditions require.

As narrowing of the sheet is thus eliminated, there is practically no necessity for stretching the sheet laterally by a subsequent operation.

While the bait 37 is employed when the sheet is started, the use of the bait is restricted to such starting action, the bait being removed after the sheet has been gripped by gripping members to be described, the portion of the sheet adjacent the bait being severed, permitting the bait to be removed by lifting out of the carriers 36, the drawing action then being provided by the gripping members.

As shown more particularly in Figs. 4, 5 and 7, the gripping members are in the form of a pair of members 40 each having a length sufficient to extend from a receptacle 36 of one chain to the opposing receptacle of the other chain, these members being preferably faced with suitable material, such as asbestos, where the opposing faces of the members are brought into contact with the opposite sides of the sheet. Suitable clamping elements 41 carried by one member are adapted to be quickly carried over the other member to provide a gripping action on the sheet by pressure applied at the ends of the members. This action can be readily had by operators at opposite sides of the machine, so that the grips can be placed in position while the chains are moving and while drawing action is being had. Since the members 40 are in contact with the sheet throughout the sheet width, and elements 41 apply the pressure on the members beyond the edges of the sheet, it will be clear that the gripping contact between the grips and the sheet is provided in such manner as to reduce liability of marring the face of the glass to a minimum.

By this arrangement of grips, and the manner in which they are removably mounted on the chains, it will be clear that successive grips can be placed in position at regular distances by the operators using predetermined carriers 36 to receive the grips.

As will be understood from Figs. 3 to 5, the ends of the grips which extend into the pockets or receptacles 36 of the opposite chains have a more or less frictional engagement with the bottoms of the pockets owing to the weight of the sheet of glass being drawn. Hence, any tendency of the chains to sway is resisted by this frictional engagement and also by the fact that any movement of the grips under swaying of the chains would require shifting of the sheet itself and in the direction of sheet width. Since the sheet width is generally of considerable extent, there is practically no tendency to produce such shifting action. In addition, the fact that both members 40 extend into the pockets causes the general arrangement to more accurately travel in the drawing plane, thereby preventing movements of the sheet from such plane while the sheet is setting.

The present invention is designed more particularly to eliminate as far as possible all contacting elements, such as rollers, which would affect the sheet. As will be understood, the only surface contact is that provided by the grips, and this contact is in such manner as to reduce the possibility of marring. Since this effect is desired, and the drawing operation is designed to be continuous, means are provided for severing the continuous drawn sheet into glass sheets of the desired length, these sheets being successively removed from the apparatus.

The severing action is preferably provided by an apparatus operating as a torch of the oxy-acetylene type, the torch, indicated at 42, being in the form of a tube having a row of nozzles 42ª which extend transversely of the sheet, the element 42 being connected to the source of supply through suitable controllable flexible connections. The torch is removably supported in brackets 43 carried by one of the members 40, each pair of members carrying a set of brackets for this purpose. The torch is placed in position by the operators and travels with the sheet, brackets 43 being so arranged as to place the torch above the plane of the grips. Consequently, when the torch is operated, the sheet will be severed above the grip, leaving that portion of the glass above the severed line supported by the upper grip (or the bait in Fig. 3), while the grip which forms the support for the torch is acting to continue the drawing action on the sheet. By removing the severed portion, obstruction to the passage of the sheet being drawn is removed. As the torch performs its function rapidly, it may be quickly removed from position and, for the convenience of the operators, may be placed on brackets 44 carried by the frame, thus placing it in position to be quickly applied when the succeeding severing action is to be had.

I prefer to employ a torch of this type not only by reason of its ability to quickly sever without any tendency to shatter or damage the sheet, but additionally because of the presence within the sheet of wires 38 which remain within the severed sheets. This is also of advantage in case the apparatus is employed for the production of wire glass, in which case, members 27 are replaced by a member adapted to permit the passage of the wire mesh which passes upward through the bath in the manner indicated by wires 38, and is embedded in the drawn sheet. Since the glass thus carries a considerable amount of metal, the severing action can take place without damaging either the glass or the equipment. Consequently, the apparatus, by simply changing the form of members 27, can be employed for drawing either sheets of wire glass or sheets of glass free from wire mesh.

The form of member 27 employed when wire glass is being produced is shown in Fig. 10, Fig. 9 indicating diagrammatically the manner in which the parts are arranged for this purpose.

As will be readily understood from Fig. 3, a plurality of grips may be in position on the sheet at the same time, the lower grip tending to prevent change in the portion of the glass sheet between the grips, thus tending to act to isolate the portion of the sheet which is cooling preliminary to being severed. As both grips are moving at the same speed, this isolation does not affect the drawing action.

After the severing action has taken place and as the severed sheet is approaching the upper end of the chain flight, the supporting grip is engaged by suitable hooks carried by a traveling crane 50 mounted on the framework, the crane lifting the grip and the sheet carried thereby from the chains and then moving over the frame to a point where it can readily place the glass sheet in an apparatus for delivering the sheet to an annealing oven or a leer. A simple form of apparatus for this purpose is shown in the drawings, comprising a roller 51 carrying a row of arms 52 as shown in the drawings, or a plurality of arms arranged in rows. Arms 52 of each row are in alinement longitudinally of roller 51 and each is arranged with a shoe 52ª within which the lower edge of the sheet can be passed to hold the sheet in position. When the sheet is seated, the grip is removed and the sheet allowed to pass into contact with arms 52, after which the roller 51 is moved to carry arms 52 below the plane of bars 53 extending from the leer, the sheet of glass being thus deposited on these bars.

The delivery apparatus is preferably located at a point where the travel of the crane is transverse to the drawing plane of the sheet. This arrangement together with the particular location of chains 28 which present carriers 36 in the manner indicated, it will be readily understood that removal of the severed sheet may be expeditiously had without liability of the sheet being damaged, it being necessary only to operate the crane to lift the grip of the severed sheet out of the carriers at a greater speed than the travel speed of the chains, after which the grip and sheet carried thereby may be bodily moved out of the path of the succeeding grip and deposited on the delivery apparatus, the open tops of carriers 36 permitting this operation to be provided.

The leer or annealing oven may be of any desired type, a preferred arrangement being one in which the entrance end is adapted to be maintained at a proper temperature. One way in which this may be provided is by forming the floor of this portion of the leer with stones, it being preferred to provide an arrangement of this type for a distance at least equal to the length of four severed sheets.

Likewise, the means employed for moving the sheets through the leer may be of any suitable type, the bar structure shown being diagrammatic of a well known apparatus which is adapted to move the sheets progressively through the leer step by step, the bars being arranged to travel above and below the supporting plane for the sheets, the bars raising the sheets and carrying them rearward and then depositing the sheets on to the supporting surface and passing below the plane of such surface to move rearward before again contacting with the sheets.

As will be understood, the drawing action is at a uniform speed, and, with the level of the molten glass maintained, the drawing action will be uniform, the wires 38 which are embedded at the edges of the drawn glass traveling in definite paths and acting to prevent the narrowing effect present in prior devices for this purpose. Consequently, there is no necessity for contact of any rolls with the surface of the glass, an arrangement which tends to chill the glass, nor is there a requirement of a re-heating action-such as is required where the sheet has its direction of travel changed, the present invention having the movement of the continuous sheet entirely within a single plane—the drawing plane.

The embedded wires 38 of the severed sheets may remain as a part of the sheet, or, if desired, this portion may be readily cut off after the sheet has been finished, these wires forming a metallic core, tending to prevent shattering of the severed sheet in an obvious manner.

It will also be seen that the sheet will be of uniform width by reason of the fact that the wires have definite paths of travel, the upper ends of members 27 maintaining the proper spacing between the wires at the drawing point, the upper ends of the wires being properly spaced first by the bait and then by the action of the grips on the sheet.

Another feature of the present invention is the fact that the thickness of the sheet can be controlled to a certain extent by the size of the wires 38, it being possible, by the use of heavier wires to draw sheets of considerable thickness, the wires forming positive means in the drawing action for providing this result.

What I claim is:—

1. That improvement in the art of glass making which consists in drawing a continuous sheet of glass from the mass of molten glass, successively severing individual sheets from the continuous sheet by the action of a traveling flame, and moving the severed sheet away from the continuous sheet at an increased speed over the travel of the continuous sheet.

2. That improvement in the art of glass making which consists in drawing a continuous sheet of glass from the mass of molten glass, successively severing individual sheets from the continuous sheet by the action of a flame during the travel of the continuous sheet in the drawing plane, moving the severed sheet in the drawing plane at an increased speed and then away from the drawing plane.

3. That improvement in the art of glass making which consists in drawing a continuous sheet of glass from the mass of molten glass, successively severing individual sheets from the continuous sheet by the action of a traveling oxy-acetylene flame, moving the severed sheet in the drawing plane at an increased speed and then away from the drawing plane.

4. That improvement in the art of glass making which consists in drawing a sheet of glass from the mass of molten glass and concurrently embedding a metallic core at the edges of the sheet to maintain the width of the sheet as it recedes from the drawing level, and producing individual sheets successively by subjecting the continuous sheet to successive operations of a traveling oxy-acetylene flame, moving the severed sheet in the drawing plane at an increased speed and then away from the drawing plane.

5. That improvement in the art of glass making which consists in concurrently drawing a sheet of glass from the mass of molten glass and edge-defining metallic cores from below the level of the molten glass, whereby said cores will be embedded within the sheet parallel with each other and with the sheet edges, and producing individual sheets carrying the cores by subjecting the continuous sheet to successive operations of a traveling oxy-acetylene flame, moving the severed sheet in the drawing plane at an increased speed and then away from the drawing plane.

6. That improvement in the art of glass making which consists in concurrently drawing a sheet of glass from the mass of molten glass and edge-defining metallic cores from below the level of the molten glass, whereby said cores will be embedded within the sheet parallel with each other and with the sheet edges and subjecting the core-contained edge portions of the sheet to air blasts, and producing individual sheets by subjecting the continuous sheet to successive operations of an oxy-acetylene flame while the continuous sheet is traveling from the point of air blast application, moving the severed sheet in the drawing plane at an increased speed and then away from the drawing plane.

7. That improvement in the art of glass making which consists in concurrently drawing a sheet of glass from the mass of molten glass and edge-defining metallic cores from below the level of the molten glass, with the drawing level located within a chamber having a passageway for the sheet of glass, whereby said cores will be embedded within the sheet parallel with each other and with the sheet edges, subjecting the core-contained edge portions of the sheet to air blasts in proximity to the point of emergence of the sheet from the passageway, and producing individual sheets by subjecting the continuous sheet to successive operations of an oxy-acetylene flame while the continuous sheet is traveling from the point of air blast application, moving the severed sheet in the drawing plane at an increased speed and then away from the drawing plane.

8. In a glass drawing machine and in combination, a receptacle for molten glass, means for drawing a sheet of glass therefrom, said means including a traveling elevator structure, and a torch for severing the sheet into individual sheets, said elevator having means for removably supporting the torch, and means for moving the severed sheet in the drawing plane at a greater speed than the travel of the unsevered sheet and then away from said plane.

9. In a glass drawing machine and in combination, a receptacle for molten glass, means for drawing a continuous sheet of glass therefrom, said means including a traveling elevator structure, a grip structure detachably carried by the elevator structure and adapted to extend across and clamp the sheet, and means operative on one side of the sheet for severing it into individual sheets during the travel of the continuous sheet, said severing means including a burner structure supported from the gripping means, said grip structure acting as a support and carrier for the individual sheet after it has been severed.

10. In a glass drawing machine and in combination, a receptacle for molten glass, means for drawing a continuous sheet of glass therefrom, said means including a traveling elevator structure, and a grip structure detachably carried by the elevator structure and adapted to extend across and clamp the sheet, an oxy-acetylene torch movable with and adapted to sever the sheet into individual sheets, brackets carried by the grip structure for detachably supporting said torch, and means for moving the severed sheet away from the unsevered sheet.

11. In a glass drawing machine and in combination, a receptacle for molten glass, means for drawing a continuous sheet of glass therefrom, said means comprising a pair of endless carriers having their axes transverse to the plane of the sheet, and a grip structure adapted to extend across and to clamp the sheet, said carriers and the grip structure having complemental means for detachably supporting the latter during the drawing operation, and means for severing individual sheets including a burner structure carried by the grip structure and disposed above the latter.

12. In a glass drawing machine and in combination, a receptacle for molten glass, means for drawing a continuous sheet of glass therefrom, said means comprising a pair of endless carriers having their axes transverse to the plane of the sheet, and a grip structure adapted to clamp the sheet, said carriers and the grip structure having complemental means for detachably supporting the latter during the drawing operation, the means of said carriers being in the form of U-shaped receptacles carried by the carriers and adapted to travel in unison, and means for severing individual sheets including a burner structure carried by the grip structure.

13. In a glass drawing machine and in combination, a receptacle for the molten glass, said receptacle having means projecting upwardly from its bottom to permit the passage of metallic structures in the drawing plane, said means terminating below the level of glass within the receptacle, means for maintaining the level of the glass in the receptacle, a float for defining the drawing limits of the receptacle, and means including a grip structure for drawing a continuous sheet of glass from the receptacle and concurrently drawing the metallic structure from said receptacle means, whereby said metallic structure will act to prevent narrowing of the sheet, means for applying an air blast to the edge of a sheet, and means for severing individual sheets including a burner structure carried by the grip structure.

14. In glass drawing mechanism and in combination, a receptacle for molten glass, means for drawing a continuous sheet of glass of predetermined width therefrom with the width of the sheet maintained as the sheet recedes from the drawing level, said means including a pair of endless carriers having their axes transverse to the plane of the sheet, and grip structures detachably engaging the sheet and said carriers, means including a traveling flame for severing the continuous sheet into individual sheets during the travel of the continuous sheet, said grip structure forming a support for the severed sheet, a crane having members adapted to engage said grip structure and remove it from the carriers, said crane being movable in a direction transverse to the sheet drawing plane to remove the sheet and its grip structure bodily from said plane.

15. In glass drawing mechanism and in combination, a receptacle for molten glass, means for drawing a continuous sheet of glass of predetermined width therefrom with the width of the sheet maintained as the sheet recedes from the drawing level, said means including a pair of endless carriers having their axes transverse to the plane of the sheet, and grip structures detachably engaging the sheet and said carriers, means traveling with the sheet and including a burner structure for severing the continuous sheet into individual sheets during the travel of the continuous sheet, said grip structure forming a support for the severed sheet, a crane having members adapted to engage said grip structure and remove it from the carriers, said crane being movable in a direction transverse to the sheet drawing plane to remove the sheet and its grip structure bodily from said plane, a sheet treating structure, and mechanism in advance of said latter structure and below the path of travel of the crane for delivering the sheet to the structure after the crane has moved the sheet from the drawing plane.

In testimony whereof I affix my signature in presence of two witnesses.

THOMAS H. CHADWICK.

Witnesses:
W. G. DOOLITTLE,
ALICE B. DICE.